United States Patent [19]

Toyama et al.

[11] Patent Number: 4,823,187
[45] Date of Patent: Apr. 18, 1989

[54] COLOR TELEVISION CAMERA HAVING A TEST PATTERN PROJECTED THROUGH A NON-INCIDENT PRISM PLANE

[75] Inventors: Mitsuaki Toyama, Musashino; Tameaki Ebihara, Yamato; Syohei Kawai, Sagamihara; Keizo Kono, Tokyo; Nobuo Shimoda, Hachioji, all of Japan

[73] Assignee: Victor Company of Japan, Ltd., Kanagawa, Japan

[21] Appl. No.: 70,429

[22] Filed: Jul. 7, 1987

[30] Foreign Application Priority Data

Jul. 9, 1986 [JP] Japan .................................. 61-159569

[51] Int. Cl.$^4$ ..................... H04N 9/093; H04N 9/097; H04N 9/09
[52] U.S. Cl. ......................................... 358/51; 358/50; 358/55
[58] Field of Search ....................... 358/51, 50, 10, 52, 358/41, 43, 44, 55

[56] References Cited

U.S. PATENT DOCUMENTS 4,709,260 11/1987 Geerts et al. .......................... 358/51

FOREIGN PATENT DOCUMENTS 7070 4/1986 Japan .

OTHER PUBLICATIONS

Philips LDK6A Camera brochure, May 1963.

Primary Examiner—Edward L. Coles, Sr.
Assistant Examiner—Robert M. Bauer
Attorney, Agent, or Firm—Michael N. Meller

[57] ABSTRACT

A three tube type color television camera comprises an optical system using a prism for the three color separation in which an image of a test pattern is introduced into an optical path of the camera through the optical system. The optical system has an incident plane onto which the image of the test pattern is projected by a pattern projector closely located with respect to the incident plane.

6 Claims, 2 Drawing Sheets

COLOR TELEVISION CAMERA HAVING A TEST PATTERN PROJECTED THROUGH A NON-INCIDENT PRISM PLANE

BACKGROUND OF THE INVENTION

The present invention relates to a three tube type color television camera especially for professional use, and in particular to a color separation system using prisms in the television camera.

A conventional three-tube type color television camera for professional use is illustrated in FIG. 1. Referring to this figure, light from an object (not shown) to be picked up is supplied to an optical system 11 for three-color separation through an image pickup lens 10. The optical system separates the received light into three primary colors of red (R), green (G) and blue (B). The separated three color components R, G and B are sent to image pickup tubes 12R, 12G and 12B, respectively. The image pickup tubes carry out the optical-electro conversion and produce video signals of corresponding colors. Those video signals are fed to corresponding pre-amplifiers 13R, 13G and 13B, which amplify the received signals. The output signals of the pre-amplifiers are then delivered to corresponding processing amplifiers 14R, 14G and 14B, which preprocess the output signals for subsequent color encoding. The output signals of those processing amplifiers are fed to a color encoder 15, which composes the received signals into a composite color video signal conforming, for example, to the NTSC (National Television System Committee) standard.

As the optical system 11 for the three color separation, an dichroic mirror system or an prism system using a three-color separation prism is known. Although the latter needs a particular image lens having a long lens mount to focal point distance, it is possible to design the optical system of small size, simple structure and high transmittance with the prism system. Therefore, most of the television cameras for professional use employ the prism system to which the present invention relates.

The description will now be given of a conventional optical system using prisms. FIG. 2 illustrates a conventional optical system of this type. Incident light from an object (not shown) passes through an image lens 10 (generally made up of a plurality of convex lenses), and then enters along an optical axis 20 into a blue separation prism 16B of a three-color separation prism system 16. The light reaches a dichroic mirror $b_1$ provided on the inclined surface of the blue separation prism 16B, which is slanted with respect to the optical axis 20. There, only the blue component of the light is totally reflected on the dichroic mirror $b_1$, leaving the other components to pass through into a red separation prism 16R of the three-color separation prism system 16 and then reach a dichroic mirror $r_1$ provided on one of the inclined planes thereof. There, the red component is totally reflected on the dichroic mirror $r_1$, leaving the remaining component, i.e. the green component, to pass through into a green separation prism 16G. Consequently, three primary color components are separated from the incident light passing through the image lens 10 and supplied to the corresponding image pickup tubes through corresponding trimming filters 17R, 17G and 17B. The trimming filters 17R, 17G and 17B mounted on the prisms 16R, 16G and 16B act to enhance the purity of the red, green and blue components, respectively.

In general, the three-tube type television camera as described above needs a series of adjustments prior to the start of use thereof. Those preadjustments include resolution, registration, centering and grey scale alignment procedures, for example. In detail, a uniformly illuminated test pattern, designed appropriate to a desired alignment procedure for the television camera, is located on the optical axis of the television camera so as to directly oppose the camera. The framing alignment is then carried out to obtain the specified viewing area of the image of the test pattern. Those alignment procedures are partly performed automatically by automatic adjustment circuits built into the television camera with assistance of the human operator. In such alignment procedures, the test pattern of a transparency or a positive illuminated by external light is generally employed. However, the alignment procedures are complex and cumbersome even with the automatic adjustment circuits, for instance, and the procedures require frequent exchange for different patterns. In addition, there is the possibility that the best pattern to be exchanged is not at hand but located remote from the human operator due to the lens system of the television camera.

In order to minimize the problem, a television camera with a built-in pattern projector was recently proposed. Such a television camera has been disclosed in the Japanese Patent Publication No. 7070/86, for example. This type of the proposed television camera with a built-in projector is based upon one of the following two arrangements.

(1) An arrangement in which the pattern image is introduced into the optical path of the camera, by using a light deflector which is interposed between two lenses forming an image pickup lens.

(2) An arrangement in which the pattern projector moves in front of the three-color separation prism system, replacing the bias light supply device which moves out when the alignment is carried out.

It should be noted that the arrangement (1) involves the construction of the image pickup lens making it difficult to be exchangeable. Otherwise, it is necessary to prepare one pattern projector for each image pickup lens. In other words, when the operator replaces every time his image pickup lens or zoom lens with another for picture-taking purposes, he must replace the pattern projector together for pre-adjustments. The construction of the arrangement (1) with exchangeable lenses is therefore complex and expensive. Further, it is necessary to carry out the framing adjustment for a newly replaced test pattern before proceeding to other adjustments, since the new test pattern is introduced into the optical path through the replaced image pickup lens. Thus, the alignment procedure of this is time consuming and cumbersome.

The arrangement (2) is not subject optically to the image pickup lens. Instead it requires many optical components including the bias light supply device made movable yet keeping them in precision. In detail, space between the rear portion of the image pickup lens and the front portion of the three-color separation prism system is considerably limited in the practical camera. In this limited space, there are arranged many components such as filters and the bias light supply device. In fact, the space between two adjacent components is approximately 0.5 m/m. This means that it is extremely difficult to insert another component into that space.

Therefore, the arrangement (2) described above is so designed as to move out the bias light supply device and instead insert the pattern projector therein. In this case, the pattern projector must be formed so as to have the thickness of less than approximately 4.0 m/m, because the thickness of the bias light supply device itself is approximately 4.0 m/m. As a result, the arrangement (2) requires high precision, and is a complex and expensive system. In addition, it is necessary to provide the camera with additional space to install a mechanism for moving the bias light supply device away and instead inserting the pattern projector. It is therefore difficult to make the camera compact.

SUMMARY OF THE INVENTION

Accordingly, it is a general object of the present invention to provide a novel and useful color television camera in which the problems described heretofore are eliminated.

Another and more specific object of the present invention is to provide a three-tube type color television camera in which an image of a test pattern is introduced into an optical path of the camera through an optical system using prisms. To accomplish this, the optical system has an incident plane onto which the image of the test pattern is projected by a pattern projector closely located with respect to said incident plane. This means that the present color television camera has the pattern projector built into the camera body thereof, not the image pickup lens. Consequently, even when various zoom lenses are used as the image pickup lens, the adjustments can be performed by only one pattern projector installed in the camera body.

Other objects and further features of the present invention will be apparent from the following detailed description when read in conjunction with the accompanying drawings.

DETAILED DESCRIPTION

Figure 1:
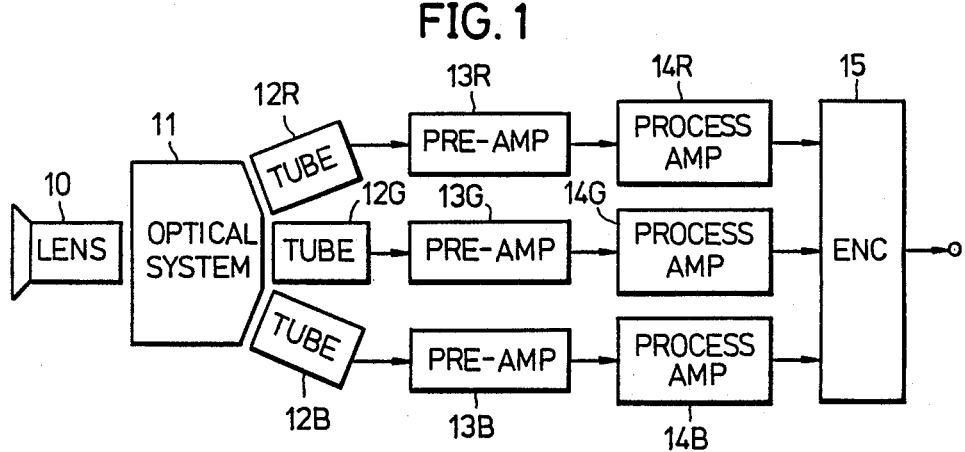
FIG. 1 is block diagram of a three-tube type color television camera.
Figure 2:
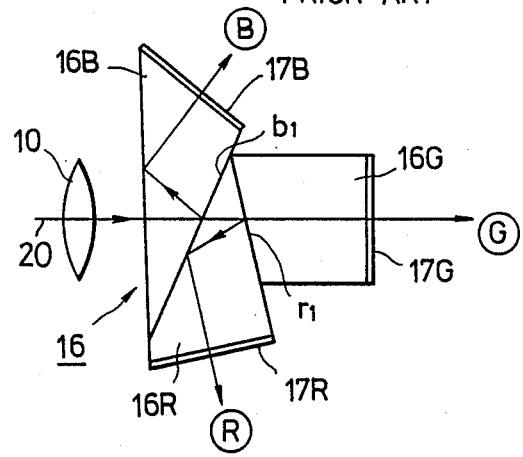
FIG. 2 is a side view of a conventional optical system using prisms.

The present invention relates to a three-tube type color television camera. Therefore, the invention basically includes elements as shown in FIG. 1, that is, the image pickup lens 10, the optical system 11, the image pickup tubes 12R, 12G and 12B, the pre-amplifiers 13R, 13G and 13B, the signal processing circuits 14R, 14G and 14B, and the encoder 15. One of features of the present invention exists in the optical system 11.

Figure 3:
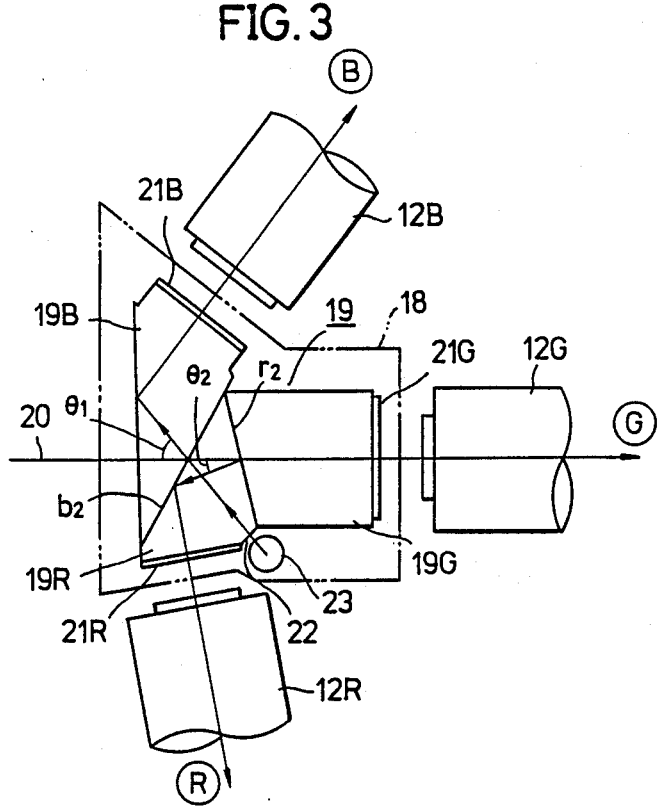
FIG. 3 is a side view of an optical system using prisms of a color television camera according to one embodiment of the present invention.

FIG. 3 illustrates an optical system using prisms in a color television camera according to one embodiment of the invention. An optical system 18 using prisms in this figure is employed as the optical system 11 shown in FIG. 1. Referring to FIG. 3, a three-color separation prism 19 in the optical system 18 includes a blue separation prism 19B, a red separation prism 19R and a green separation prism 19G. The front plane of the blue separation prism 19B is perpendicular to the optical axis 20 of the color television camera. On an inclined plane of the blue separation prism 19B, there is deposited a dichroic mirror $b_2$ for reflecting the blue light component coming from the front plane. The dichroic mirror $b_2$ is a deposited film made up of multiple layers. The blue component of the incident light entering into the blue separation prism 19 parallel to the optical axis 20 is reflected by the dichroic mirror $b_2$ and turned toward the front plane of the blue separation prism 19B. The prism 19B is so designed that the angle formed by the front plane thereof and the reflected blue component is kept small for total reflection. In this situation, the angle $\theta_1$ formed by the optical axis 20 and the reflected light of the blue component is equal to 53°, for example. Therefore, the light of the blue component reflected by the dichroic mirror $b_2$ is totally reflected on the front plane of the prism 19B, and is supplied to the image pickup tube 12B for the blue channel through a trimming filter 21B.

Light not reflected by the dichroic mirror $b_2$ enters into a red separation prism 19R through a very narrow air layer (not shown) which exists between the blue and red separation prisms 19B and 19R. The entered light penetrates the red separation prism 19R along the axis 20 and reaches a dichroic mirror $r_2$ for reflecting red light coming from the blue separation prism 19B, which is deposited on the inclined plane of the red separation prism 19R. The dichroic mirror $r_2$ is also a deposited film having multiple layers. The red component reaching the dichroic mirror $r_2$ is reflected and turned toward the inclined plane of the red separation prism 19R, which is faced with the dichroic mirror $b_2$. The red separation prism 19R is so designed that the angle formed by the inclined plane faced with dichroic mirror $b_2$ and the reflected light of the red component is within the critical angle referred to the total reflection. In this situation, the angle $\theta_2$ formed with the reflected red component and the axis 20 is equal to 21°, for example. Therefore, the reflected red component is totally reflected on the plane of the prism 19R faced with the dichroic mirror $b_2$. Then, the red component extracted from the red separation prism 19R is supplied to the image pickup tube 12R for the red channel through a trimming filter 21R.

Light not reflected by the dichroic mirror $b_2$ or $r_2$, i.e., light of the green component, passes through a green separation prism 19G, and is then supplied to the image pickup tube 12G for the green channel through a trimming filter 21G.

At a corner portion of the red separation prism 19R where the plane on which the trimming filter 21R is deposited meets the plane on which the dichroic mirror $r_2$ is deposited, there is formed a plane 22. It is referred to as an incident plane hereafter. The incident plane 22 is a completely flat surface. No trimming filter for the red channel is deposited on the incident plane 22. A pattern projector 23 for projecting a test pattern is located with respect to the plane 22 as follows. That is, the arrangement of the pattern projector 23 is determined so that light perpendicularly projected by the pattern projector 23 with respect to the incident plane 22 reaches an intersection of the optical axis 20 and the dichroic mirror $b_2$, and light reflected by this dichroic mirror $b_2$ goes along the axis 20. In other words, the pattern projector 23 is so located that the angle formed by the axis 20 and light projected by the pattern projector 23 is equal to the angle $\theta_1$ formed by the axis 20 and the blue component reflected by the dichroic mirror $b_2$. Therefore, the incident plane 22 on the red separation prism 19R is so formed as to be perpendicular to the light projected by the pattern projector 23. It will therefore be understood from the above description that the image of the test pattern from the pattern projector 23 is directly introduced into the optical path of the television camera through the three-color separation prism 19.

Figure 4:
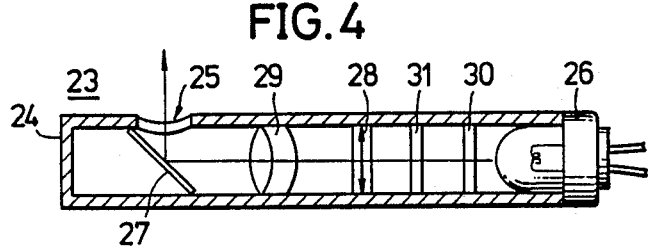
FIG. 4 is a sectional view of a pattern projector used in the television camera shown in FIG. 3.

FIG. 4 illustrates the longitudinal section of the pattern projector 23 in FIG. 3. Referring to this figure, the pattern projector 23 has a housing 24 of a hollow cylindrical shape. A through window 25 is formed by cutting off part of the cylindrical wall. In an opening end of the housing 24, there is inserted a light source 26, which is preferably a halogen lamp. Under the window 25, there is provided a mirror 27 which reflects light supplied from the light source 26 and sends out the reflected light through the window 25. A test pattern 28 is disposed between the mirror 27 and the light source 26. The test pattern 28 of various designs is selected for the purpose of the adjustment of resolution, registration, centering or grey scale. A projection lens 29 is disposed between the mirror 27 and the test pattern 28. Preferably, a color filter 30 for compensating the spectral characteristic as well as an ND filter 31 for adjusting the intensity of light are interposed between the light source 26 and the test pattern 28, as shown in FIG. 4. Although the color filter 30 is faced with the light source 26 in FIG. 4, it is also possible to substitute the ND filter 31 in place of the color filter 30. The reason for use of those filters will be described later.

The pattern projector 23 is located so that the window 25 is faced with the incident plane 22 of the red separation prism 19R and light projected by the pattern projector 23 penetrates the prism 19R with the angle $\theta_1$ with respect to the optical axis 20.

The description will now be given of the adjustment operation in the present television camera, which operation is carried out prior to the start of picture taking, for example.

First, the diaphragm or shutter for the image pickup lens of the television camera is closed. This is performed electro-mechanically by, for example, closing a switch for the purpose, which is mounted on the body of the television camera. Thus, the incident light in front of the pickup lens is interrupted. Then, the light source 26 is turned on. This may cooperate with the above switching operation. The light source 26 projects the test pattern 28 through the filters 30 and 31. Light derived from the test pattern 28 (hereafter referred to as pattern light) passes the projection lens 29 and is reflected on the mirror 27. Then, the reflected light is introduced into the red separation prism 19R through the window 25 and the incident plane 22. It should be noted that the pattern light is projected onto the incident plane 22 so that it passes the intersection of the optical axis 20 and the dichroic mirror $b_2$, and the light reflected at the dichroic mirror $b_2$ goes along the axis 20. As a result, the blue component of the pattern light passes through the dichroic mirror $b_2$ and penetrates the blue separation prism 19B along the same path as that of the blue component of the incident light from the image pickup lens. Then, the blue component is totally reflected by the front plane of the blue separation prism 19B and is sent through the trimming filter 21B to the image pickup tube 12B for the blue channel. On the other hand, the remaining components of the pattern light are reflected by the plane facing the air layer and go inside the red separation prism 19R along the axis 20. The red component of the reflected light mentioned above is further reflected by the dichroic mirror $r_2$, and the remaining component, i.e. the green component, passes through the dichroic mirror $r_2$ and then enters into the green separation prism 19G. The reflected red component is further reflected on the plane of the prism 19R facing the air layer, and is sent to the tube 12R through the trimming filter 21R. On the other hand, the green component passes through the trimming filter 21G and is received by the tube 12G. It will be apparent from the above description that the pattern light supplied by the pattern projector 23 is separated into three primary color components, which share the same paths as those of the three components of the incident light which entered into the blue separation prism 19B. The image pickup tubes 12R, 12G and 12B convert the received light into the corresponding electrical signals, which are supplied to the color encoder 15 through the preamplifiers 13 and the process amplifiers 14. The composite color video signal outputted by the encoder 15 is supplied to the automatic adjustment circuits, each of which carries out the corresponding automatic adjustment. Upon completion of the above adjustments, the television camera is ready to operate for picture taking.

As described before, preferably, the pattern projector 23 includes the filters 30 and 31, which allows the pattern light to be adjusted for color temperature and intensity. The reason for this is as follows. There is a difference of brightness of the test pattern image measured at the image tube front face between the two cases that one is the pattern projector of the present invention and another is the conventional method in which the test pattern is placed in front of the camera and is illuminated by an external light. In detail, if it is so adjusted that both the conventional method and the pattern projector render equal brightness at the face of the image tube 12G for green, the conventional method renders a brighter test pattern image than the pattern projector renders, both measured at the face of the image tube 12R for red, and the brightness relation is reversed at the face of the image tube 12B for blue. This is because the reflectivity of the dichroic mirror $b_2$ for the incident blue light is different from that of the plane of the red separation prism 19R for the pattern light from the pattern projector. Therefore, the color filter 30 as well as the ND filter 31 are preferably equipped for compensating the difference in brightness.

The present invention is not limited to the above embodiment. For example, the invention includes a television camera having an optical system using prisms other than that shown in FIG. 3, so long as the condition described above is satisfied. Also, it is possible to combine the invention with the conventional methods. That is, the adjustment using external light and/or the zoom lens having the built-in pattern projector can be performed together with the adjustment according to the present invention for convenience.

What is claimed is:
1. A color television camera comprising:
   lens means for receiving light from an object to be picked up, said light passing through said lens means,
   prism means for separating said light into red, green and blue lights, said red, green and blue lights following optical paths of said camera, said prism means having a front plane facing said lens means to receive said light which passes through said lens means and an incident plane provided exclusively for passing an image of a test pattern into said optical paths of said camera, said incident plane being a plane other than said front plane, pattern projection means for projecting the image of said test pattern onto said incident plane of said prism means, image pickup means for converting the lights sent from said prism means into electrical signals, and signal process means for processing said electrical signals and producing a video signal.

2. A color television camera as claim in claim 1, wherein said incident plane is formed so that said test pattern sent from said pattern projection means perpendicularly passes through said incident plane.

3. A color television camera comprising;

lens means for receiving light from an object to be picked up, prism means for separating said light into red, green and blue lights, said prism means having an incident plane through which an image of a test pattern is introduced into an optical path of said camera, pattern projection means for projecting the image of said test pattern onto said incident plane of said prism means, image pickup means for converting the lights sent from said prism means into electrical signals, and signal process means for processing said electrical signals and producing a video signal, said prism means including red, green and blue separation prisms, and dichroic mirrors deposited on planes of said red and blue separation prisms, and wherein said incident plane is formed at one corner portion of said red separation prism.

4. A color television camera as claimed in claim 2, wherein said pattern projection means is located with respect to said prism means so that light derived from said pattern projection means and being reflected at a point where an optical axis of said camera intersects said dichroic mirror deposited on the plane of the blue separation prism, goes along said optical axis.

5. A color television camera comprising;

lens means for receiving light from an object to be picked up, prism means for separating said light into red, green and blue lights, said prism means having an incident plane through which an image of a test pattern is introduced into an optical path of said camera, pattern projection means for projecting the image of said test pattern onto said incident plane of said prism means, image pickup means for converting the lights sent from said prism means into electrical signals, and signal process means for processing said electrical signals and producing a video signal, said pattern projection means comprising a hollow housing, a through window formed on a wall of said housing, a light source attached to one end of said hollow housing, a mirror positioned under said window so as to reflect light from said light source and send out said reflected light through said window, a test pattern disposed between said mirror and said light source, and a projection lens disposed between said mirror and said test pattern.

6. A color television camera as claimed in claim 5, wherein said pattern projection means includes a color compensation filter and an ND filter.

* * * * *